US011555933B2

(12) United States Patent
Østergaard

(10) Patent No.: US 11,555,933 B2
(45) Date of Patent: Jan. 17, 2023

(54) NAVIGATION SYSTEM

(71) Applicant: ROTECH APS, Kalundborg (DK)

(72) Inventor: Geo Allan Østergaard, Kalundborg (DK)

(73) Assignee: ROTECH APS, Kalundborg (DK)

( * ) Notice: Subject to any disclaimer, the term of this patent is extended or adjusted under 35 U.S.C. 154(b) by 280 days.

(21) Appl. No.: 16/767,282

(22) PCT Filed: Dec. 4, 2018

(86) PCT No.: PCT/DK2018/050323
§ 371 (c)(1),
(2) Date: May 27, 2020

(87) PCT Pub. No.: WO2019/110064
PCT Pub. Date: Jun. 13, 2019

(65) Prior Publication Data
US 2020/0326431 A1    Oct. 15, 2020

(30) Foreign Application Priority Data

Dec. 5, 2017    (DK) ............................ PA 2017 70910

(51) Int. Cl.
*G08G 5/00* (2006.01)
*G01S 19/45* (2010.01)
(Continued)

(52) U.S. Cl.
CPC ............ *G01S 19/45* (2013.01); *G08G 5/0013* (2013.01); *H04B 7/18508* (2013.01); *H04W 4/42* (2018.02)

(58) Field of Classification Search
CPC .... G01S 19/45; G08G 5/0013; G08G 5/0052; G08G 5/0082; H04B 7/18508; H04B 7/00; H04W 4/42; G01C 21/00
See application file for complete search history.

(56) References Cited

U.S. PATENT DOCUMENTS 6,691,956 B1 * 2/2004 Waterman .......... B64D 45/0034
244/196
8,155,640 B1    4/2012 Battista et al.
(Continued)

FOREIGN PATENT DOCUMENTS

EP            3144694 A1    3/2017
WO      2014020932 A1    2/2014

OTHER PUBLICATIONS

International Search Report dated Jan. 28, 2019 for PCT/DK2018/050323.

(Continued)

*Primary Examiner* — Minh Trang T Nguyen
(74) *Attorney, Agent, or Firm* — Schmeiser, Olsen & Watts, LLP

(57) ABSTRACT

Provided is a navigation system for operating a navigation system, which navigation system includes a first sub navigation system placed at an aeroplane and a second stationary sub system, which first sub navigation system includes a plurality of radio receivers, which radio receivers are configured to receive signal from a plurality of navigation satellites, which navigation system includes at least one processor, which processor is configured to perform calculation of the actual position data, which navigation system includes a radio transmitter, which radio transmitter is configured to transmit position data to communication satellites. The communication satellites can include radio transmitters for transmitting position data to a ground based receiver, which second sub system includes at least one server. Hereby can position data in that way the position of that aeroplane will be calculated and the actual position data and actual time will be stored in the server.

7 Claims, 1 Drawing Sheet

(51) Int. Cl.
  *H04W 4/42*    (2018.01)
  *H04B 7/185*    (2006.01)

(56)           References Cited

U.S. PATENT DOCUMENTS 8,396,656 B1      3/2013  Karmel
  2002/0169527 A1  11/2002  Cline
  2017/0052258 A1*  2/2017  Murphy ............... G08G 5/0021
  2017/0082455 A1*  3/2017  Adler .................... B64D 45/00

OTHER PUBLICATIONS

Written Opinion dated Jan. 28, 2019 for PCT/DK2018/050323.
Danish Search Report dated May 18, 2018 for Application No. PA 2017 70910.

* cited by examiner

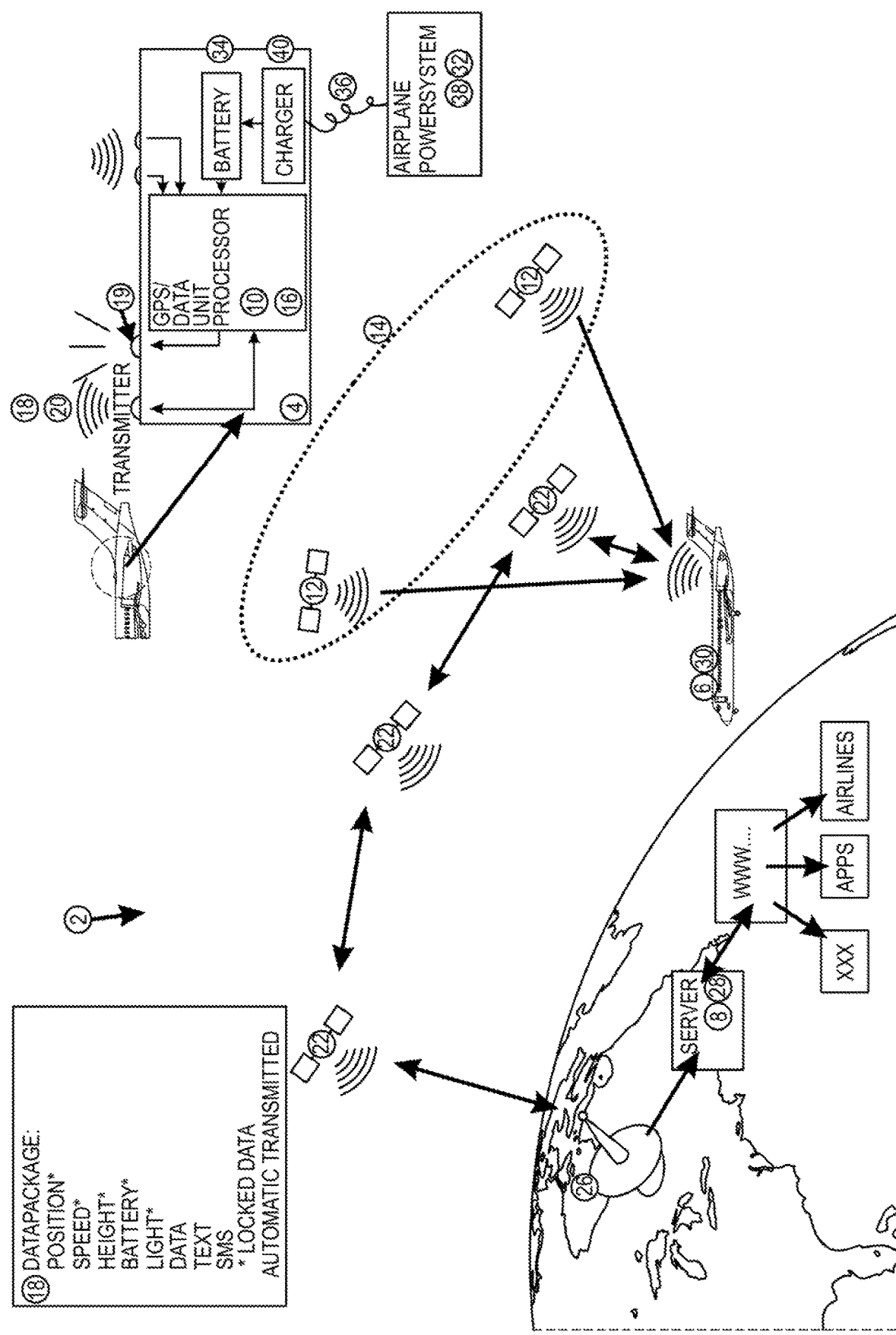

NAVIGATION SYSTEM

CROSS-REFERENCE TO RELATED APPLICATIONS

This application claims priority to PCT Application No. PCT/DK2018/050323, having a filing date of Dec. 4, 2018, which is based on DK Application No. PA 2017 70910, having a filing date of Dec. 5, 2017, the entire contents both of which are hereby incorporated by reference.

FIELD OF TECHNOLOGY

The following relates to a navigation system and a method for operating a navigation system, which navigation system comprises a first sub navigation system placed at an aeroplane and a second stationary sub system, which first sub navigation system comprises a plurality of radio receivers, which radio receivers are configured to receive signal from a plurality of navigation satellites from at least one system of navigation satellites, which navigation system comprises at least one processor, which processor is configured to perform calculation of the actual position data based on received signals from radio receivers, which navigation system comprises a radio transmitter, which radio transmitter is configured to transmit position data to communication satellites which communication satellites comprise radio transmitters for transmitting position data to a ground based receiver, which ground based receiver is configured to perform transmission of position data to the second stationary sub system, which second sub system comprises at least one server.

BACKGROUND

US2017/0082455 discloses an aircraft tracker system for reporting state information for an aircraft. A state of the aircraft is identified using sensor data received from an aircraft sensor system in the aircraft. The state information is transmitted at a reporting rate set using the state of the aircraft identified from the sensor data; at least a crew command or a ground command when at least one of the crew commands is received from a crew interface or the ground command is received from a ground source.

SUMMARY

An aspect relates to the system achieving actual position data of an aeroplane.

A further aspect is to continue operation of the navigation system in a long time period after disconnection of external power supply.

A further aspect is to operate the system at the outer surface of an aeroplane continuously and transmit position data to a satellite independent of any activity inside an aeroplane.

The aspect can be fulfilled if the first sub navigation system can be placed at an aeroplane, which first sub navigation system is configured to operate independent of an aeroplane electric system, which first sub navigation system can be configured to be placed at the outside surface of the aeroplane.

Hereby position data of the position of the first sub navigation system can be placed at an aeroplane and in that way the position of that aeroplane will be calculated, and the actual position data and actual time will be stored in the server. If that system operates rapidly it should be possible to receive new position data and store them in the server at least once per minute. These data which is available at the server can be transmitted further from the server to a customer who wants to receive the data. In this way can everybody, who is willing to pay for access to data and maybe pay for the first navigation sub system, have full access to the position of the aeroplane during any journey of that aeroplane.

Further it is possible in this way to track movement of an aeroplane on a map. It is hereby possible to see if the aeroplane is moving in the correct direction or the direction is changed away from the predicted course.

In an embodiment of the invention the first sub navigation system can be placed somewhere on or in an aeroplane, where the flight crew has no access to the first sub navigation system, it is possible that the system as such can transmit actual flight position even in a situation where the aeroplane power system is turned off, malfunction or all power in the aeroplane is gone. This is possible simply because the first sub navigation system comprises batteries which automatically take over the power supply in a period of not less than 24 hours.

Any situation where e.g. an aeroplane has landed and is parked at a platform on in a hangar, it is possible for the system to analyse that no movement takes place and the system can go into a power down mode, where detection of the position is performed with longer time intervals. In a system where e.g., there is a total power failure, because the batteries are out of life, these batteries will start charging as soon as the aeroplane power supply is established. Therefore, before an aeroplane maybe is ready to take off, batteries in the first sub navigation system will be charged because power will be available hours before first take off. In that way can be achieved that as soon as an aeroplane is ready to take off there will be mostly full power in the internal power supply in the sub navigation system. Otherwise during take-off further charging will of course take place. In a situation where e.g., the crew is switching off different power systems in an aeroplane the first sub navigation system will continue transmitting position data. In a situation where e.g., the pilot decides to switch off the aeroplane navigation system and also the radar response system the aeroplane will still be tracked by the system. This could be very important in situations where aeroplanes are disappearing because you will always have information about latest position.

In some situations the first sub navigation system will continue transmitting position data and maybe the system can be operating in a manner, where as soon as the position is fixed and there is no moving of an aeroplane, this can by a sudden sub routine cause an alert in the computer system. The system can be extremely important for all aeroplanes flying over open sea or maybe flying over Polar Regions. If an aeroplane disappears it is extremely important as soon as possible to find the correct position in as soon as possible in order to assist as fast as possible. If an aeroplane e.g. has landed at the ice at Greenland probably only the landing gear of the aeroplane will be damaged during a landing, but it is very important to get assistance to the passengers in the aeroplane, because the temperature is so low that if there is no power supply in the aeroplane the passengers will freeze to death in a few days.

In a further embodiment of the invention the first sub navigation system can be placed at the outside surface of the aeroplane. It is important that the first sub system is placed where there is full access to the sky in order to have good access from signals from navigation satellites and also having good uplink transmission possibilities for sending navigation data up to communication satellites placed above the navigation satellites. The first sub navigation system could from a technical point be placed everywhere at the upper surface of an aeroplane. Seen from an aerodynamic point of view, it will be rather critical to place the sub navigation system at the wings because they will have some aerodynamic influence. Therefore, one possible placement for the first sub navigation system at an aeroplane will be at the body, but close to the router. Here there will be less influence of the airflow around the wings and there will be a good access upwards to the different satellites.

In a further embodiment of the invention the first sub navigation system comprises an internal power supply. It is very important that the sub navigation system comprises an internal power supply. This power supply could in some situations simply be rechargeable batteries. In other situations, it could be a combination of batteries that can be charged and a back-up power supply maybe of batteries which is not chargeable. It will be very important that the power supply is able to operate at extremely low temperatures. If the system is placed outside at an aeroplane and the aeroplane is flying very high, maybe up to flight level 30, the outdoor temperature is extremely low, maybe as low as minus 50 degrees C. Therefore, the batteries in the first sub navigation system have to be able to supply sufficient power to operate even at these very low temperatures.

In a further embodiment of the invention the internal power supply comprises batteries, which batteries are charged by a power line connection to the aeroplane power system. Hereby is achieved that the batteries in the first sub navigation system are not in use in normal operation. They will take over the power supply only when the ordinary power supply is switched off. Therefore, the capacity of the batteries must be able to e.g. give a sufficient power supply more than 24 hours, but a system can be developed in a way where if the position is constant, the system will partly switch off and only send position data with longer intervals. Hereby the lifetime of the batteries will be increased. If an aeroplane is standing at a runway without moving there is no reason for sending navigation information every minute. Once per hour should be sufficient, but the system can have an algorithm which is able to switch on the system as soon as noise or operation are indicated because that is a kind of indication of movement of the aeroplane, indication of movement can also come from the GPS system.

In a further embodiment of the invention the server of the second stationary sub system comprises one or more databases, which databases comprises position data of a number of first sub navigation system. In a situation where a high number of these first sub navigation systems are in operation, each of these can transmit position data via a satellite network to the databases, where the databases will be managed in a way, where each of the sub navigation system has their own files or ID.

In a further embodiment of the invention external customers have to pay for access to position data from one or more of the first sub systems. A number of customers are in that way able to have full access to data in part of the databases. For example, a company operating a number of aeroplanes can have access to navigation data of all their aeroplanes. They can use the data as their own if they are paying for it. It will even be possible for a system operating aeroplane to give access to the pilots of the aeroplane to their actual navigation data during flying.

In a further embodiment of the invention can the system be adapted to transmit a data set indicating that power from the airplane is disconnected to the system, which data set is transmitted together with position data to the communication satellites. Hereby is information of power failure transmitted to the ground control handling service of the airplane. The ground control can contact the airplane and inform the crew of a power failure.

In a further embodiment for the invention the method comprises at least the following steps of operation:
a: place a first sub navigation system at an aeroplane,
b: connect the first sub navigation system to an external power supply at the aeroplane,
c: let radio receivers (10) receive signal from a plurality of navigation satellites from at least one system of navigation satellites,
d: let at least one processor perform calculation of the actual position data based on received signals from radio receivers,
e: let the radio transmitter transmit position data to communication satellites,
f: let the communication satellites transmit position data to a ground-based receiver,
g: let the ground-based receiver perform transmission of position data to the second stationary sub system,
h: let the second sub system perform storing of position data at one or more servers.

Hereby can be achieved that position data can be transmitted continuously at first by a system listening to navigation satellites where the first sub system has up link towards communication satellites from where navigation information is by down link transmitted to the earth and from there traditional net communication is transmitted to a server system. Hereby it is possible to have full access to the position of e.g. aeroplanes.

BRIEF DESCRIPTION

Some of the embodiments will be described in detail, with references to the following FIGURES, wherein like designations denote like members, wherein:

FIG. 1 shows a navigation system.

DETAILED DESCRIPTION

FIG. 1 shows a navigation system 2, which navigation system 2 comprises a first sub navigation system 4, which could be placed at an aeroplane 30, which could be a car or lorry, ship or aeroplane. Further is indicated a second stationary sub system 8 in form of a server. The first sub navigation system 4 comprises a plurality of radio receivers 10. These radio receivers 10 receive navigation signals from navigation satellites 12. The navigation satellites 12 are part of a system of satellites 14. Further, the first sub navigation system 4 comprises a processor 16. This processor 16 calculates position data 18. These position data 18 are transmitted by radio transmitter 20 towards one or more communication satellites 22. The position data 18 could be in form of a data package which could comprise position, speed, height, battery, light, data, text and SMS.

From the communication satellites 22, which could be geo stationary satellites, which can communicate from one to another, there will at least be one of the satellites 22 that performs a downlink communication towards a ground-based receiver 26. This ground based receiver 26 communicates to at least one server 28. The aeroplane 30 carries the first sub navigation system 4, which is placed outside at the aeroplane. The aeroplane 30 has an electric system 32, where the first sub navigation system 4 comprises batteries 34, which can operate the first sub navigation system 4 for a longer period, for example more than 24 hours and even under very harsh environmental conditions. By a power line 36 the first sub navigation system 4 can be connected to the aeroplane electric system 32 and by that system there can be a connection to the aeroplane power system 38. Because differences in power in the aeroplane and the power that has to be used in the first sub navigation system 4, it is necessary to have a charger unit to convert from the typical aeroplane 400 Hz AC system to a DC system for charging the batteries 34.

In operation the processor of the first sub navigation system 4 will have full control over the batteries 34 and the charger 40.

In a situation where the GPS indicates movement and there is a power supply in the power line 36, position data will be transmitted by a radio transmitter 20, for example once per second towards the communication satellites 22. In a situation where no power supply is detected the first sub navigation system continues operation with the power supply from the batteries 34. If the GPS further indicates that the aeroplane is parked, the first sub navigation system can send power down information to the satellites 22, and the first sub navigation system only controls position with longer time intervals, such as once per 10-60 minutes. As soon as any movement has been detected position data will be transmitted to the satellites 22.

A strobe light 19 indicates the status of the system by changing colour or frequency, indicating if operation is normal, or the power supply is switched off. In that way it is easy to all outside the aeroplane to see system status.

From the satellites 22 a downlink will connect to a receiver 26. From here there is communication to the second stationary sub system 8, which sub system 8 comprises a server 28. From this server there is communication to the worldwide net and further communication to customers, such as aviation companies who need further position data for aeroplanes.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

REFERENCE NUMBERS

Navigation system (2)
first sub navigation system (4)
vessel (6) means any car, ship or aeroplane
second stationary sub system (8)
plurality of radio receivers (10)
navigation satellites (12)
system (14) of navigation satellites (12)
processor (16)
position data (18)
strobe light (19)
radio transmitter (20)
communication satellites (22)
radio transmitters (24)
ground based receiver (26)
server (28)
aeroplane (30)
aeroplane electric system (32)
batteries (34)
power line (36)
aeroplane power system (38)
charger (40).

The invention claimed is:

1. A navigation system comprises: a first sub navigation system placed at an aeroplane and a second stationary sub system, which first sub navigation system comprises a plurality of radio receivers, which radio receivers are configured to receive signal from a plurality of navigation satellites from at least one system of navigation satellites, which navigation system comprises at least one processor, which processor is configured to perform calculation of the actual position data based on received signals from radio receivers, which navigation system includes a radio transmitter, which radio transmitter is configured to transmit position data to communication satellites, which communication satellites comprise radio transmitters for transmitting position data to a ground based receiver which ground based receiver is configured to perform transmission of position data to the second stationary sub system which second sub system comprises at least one server, wherein the second stationary sub system is configured to store the position data at the at least one server such that it is possible to check if the aeroplane is moving in a correct direction or if the aeroplane has changed away from a predicted course, which first sub navigation system is configured to be placed at an aeroplane, which first sub navigation system is configured to operate independent of an aeroplane electric system, which first sub navigation system is configured to be placed at the outside surface of the aeroplane.

2. The navigation system according to claim 1, wherein the first sub navigation system comprises internal power supply.

3. The navigation system according to claim 2, wherein the internal power supply comprises batteries, which batteries are charged by a power line connection to the aeroplane power system.

4. The navigation system according to claim 1, wherein the server of the second stationary sub system includes one or more databases, which databases include position data of a number of a number of first sub navigation system.

5. The navigation system according to claim 1, wherein external customers have to pay for access to position data from one or more of the first sub systems.

6. The navigation system according to claim 1, wherein the system is adapted to transmit a data set indicating that power from the airplane is disconnected to the system, which data set is transmitted together with position data to the communication satellites.

7. A method for operating a system as disclosed in claim 1, wherein the method comprises at least the following steps of operation:
 a: placing a first sub navigation system at an aeroplane;
 b: connecting the first sub navigation system to an external power supply at the aeroplane;
 c: radio receivers receiving a signal from a plurality of navigation satellites from at least one system of navigation satellites;
 d: at least one processor performing a calculation of the actual position data based on received signals from radio receivers;
 e: the radio transmitter transmitting position data to communication satellites;
 f: the communication satellites transmitting position data to a ground-based receiver;

g: the ground-based receiver performing transmission of position data to the second stationary sub system; and h: the second sub system performing storing of position data at one or more servers.

\* \* \* \* \*